United States Patent [19]
Kirsgalvis

[11] Patent Number: 5,840,188
[45] Date of Patent: Nov. 24, 1998

[54] SNAP FIT FILTER BAG ASSEMBLY

[75] Inventor: Richard Kirsgalvis, Michigan City, Ind.

[73] Assignee: Le Sac Corporation, Michigan City, Ind.

[21] Appl. No.: 955,033

[22] Filed: Oct. 21, 1997

[51] Int. Cl.⁶ .................................................. B01D 29/27
[52] U.S. Cl. .......................... 210/448; 210/452; 210/455; 210/497.01
[58] Field of Search ..................................... 210/232, 238, 210/446, 447, 448, 450, 451, 452, 453, 455, 485, 497.01

[56] References Cited

U.S. PATENT DOCUMENTS

| | | |
|---|---|---|
| 4,133,769 | 1/1979 | Morgan, Jr. . |
| 4,157,964 | 6/1979 | Rishel ..................................... 210/238 |
| 4,204,966 | 5/1980 | Morgan, Jr. . |
| 4,460,468 | 7/1984 | Morgan ..................................... 210/445 |
| 4,552,661 | 11/1985 | Morgan . |
| 4,701,259 | 10/1987 | Rosaen . |
| 4,986,912 | 1/1991 | Fisch ....................................... 210/448 |
| 5,137,632 | 8/1992 | Morgan, Jr. . |
| 5,279,732 | 1/1994 | Edens ..................................... 210/232 |
| 5,342,513 | 8/1994 | Wall et al. .............................. 210/471 |
| 5,358,638 | 10/1994 | Gershenson ............................. 210/448 |
| 5,624,559 | 4/1997 | Levin et al. ............................ 210/447 |
| 5,750,022 | 5/1998 | Blake et al. ............................ 210/232 |
| B1 4,204,966 | 4/1995 | Morgan, Jr. . |

*Primary Examiner*—W. L. Walker
*Attorney, Agent, or Firm*—Dvorak & Orum

[57] ABSTRACT

A liquid filter housing and filter bag assembly includes a reticulated basket fitted within a housing chamber and supported by the housing, and a replacable filter bag positioned within the reticulated basket. The filter bag includes a flexible flange which terminates with a bulbous lip which frictionally engages the housing to secure and seal the bag at the housing and basket.

18 Claims, 4 Drawing Sheets

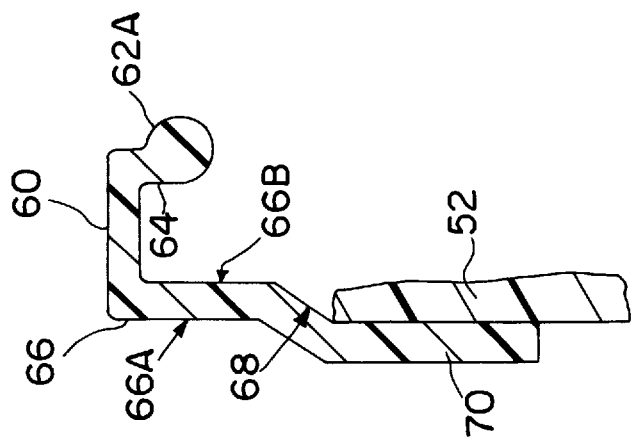
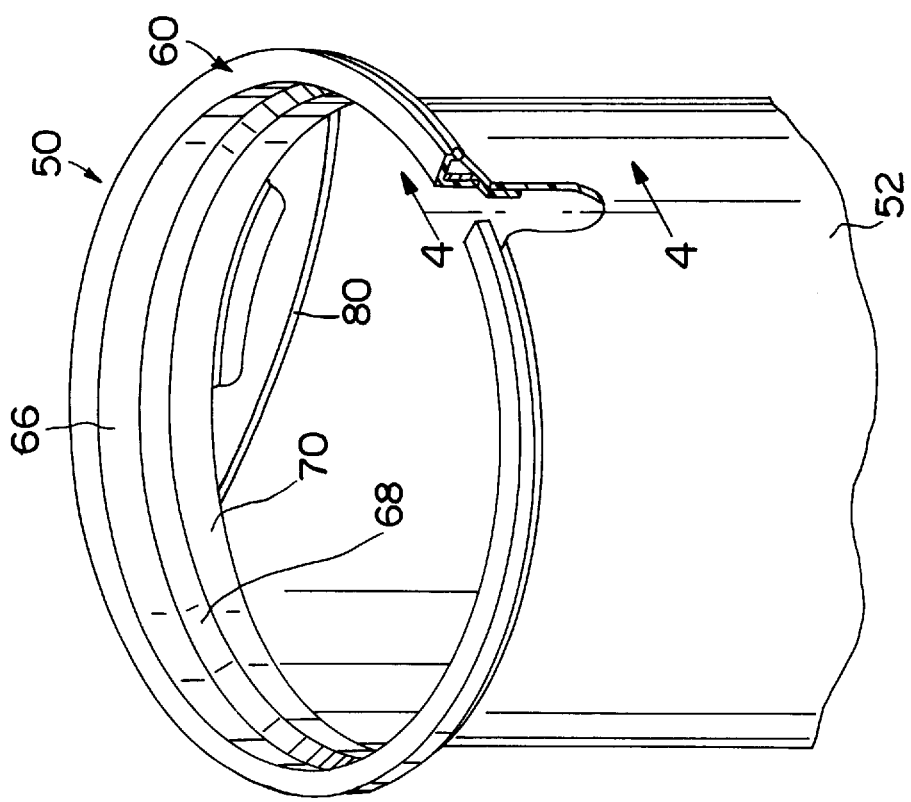

SNAP FIT FILTER BAG ASSEMBLY

BACKGROUND OF THE INVENTION

1. Field of the Invention

This invention relates to a further improvement in the construction of a liquid filter and will have particular application to the construction and manner of operation of a filter bag utilized within the filter.

2. Description of the Prior Art

Heretofore, filter bags with liquid impervious shaped-retaining edge portions, serving to define an opening end of the bag, have been of specific construction which depended upon the particular manner in which the bag was seated within the filter housing and of the particular housing design being utilized. The filter bag elements are normally seated within openings that lead into the interior of the filter housing and are located within the liquid flow path through the filter assembly. The filter bags typically include an annularly-shaped retaining ring which defines the opening into the filter bag. This retaining ring is flexible and usually contains some form of lip, thereon which, when the bag is fitted into the housing bag-receiving opening, interlocks with a channel about the housing opening to secure the bag in place within the housing. The seal formed between the lip and the channel is usually secured by snap fitting the lip into said channel, thereby making it unnecessary to provide a separate seal between the housing and any supporting basket inserted within the bag interior. This means that such designs do not depend upon the housing cover plate or other filter component to secure the bags in place. The means for securing this type of filter bag in place within the filter housing is both expedient and efficient. Thus, it can be appreciated that these type of filters can be constructed more economically than those which require use of the cover as part of the retaining and sealing means.

Accordingly, it is an object of the present invention to provide a liquid filter in which the filtering bag is secured within the filter housing by a snap-fit engagement.

It is another object of the invention to provide a liquid filter having a filter bag with a shape-retaining lip or edge portion which defines the opening into the filter bag and which includes an annular lip that is retained within the filter housing in more than one manner. It is still another object of this invention to provide a liquid filter bag which is of an economical construction and which can be interchangeably used as a replacement filter within the filter housings of different manufacturers.

Other objects of this invention will become apparent upon reading of the following description:

BRIEF DESCRIPTION OF THE DRAWINGS

FIG. 3 is a fragmentary perspective view of the filter of the present invention having portions of the bag removed for illustrative purposes.

FIG. 4 is a cross sectional view of the ring part of the filter bag as cut through line 4—4 of FIG. 3.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable other skilled in the art to best utilize the invention.

Figure 1:
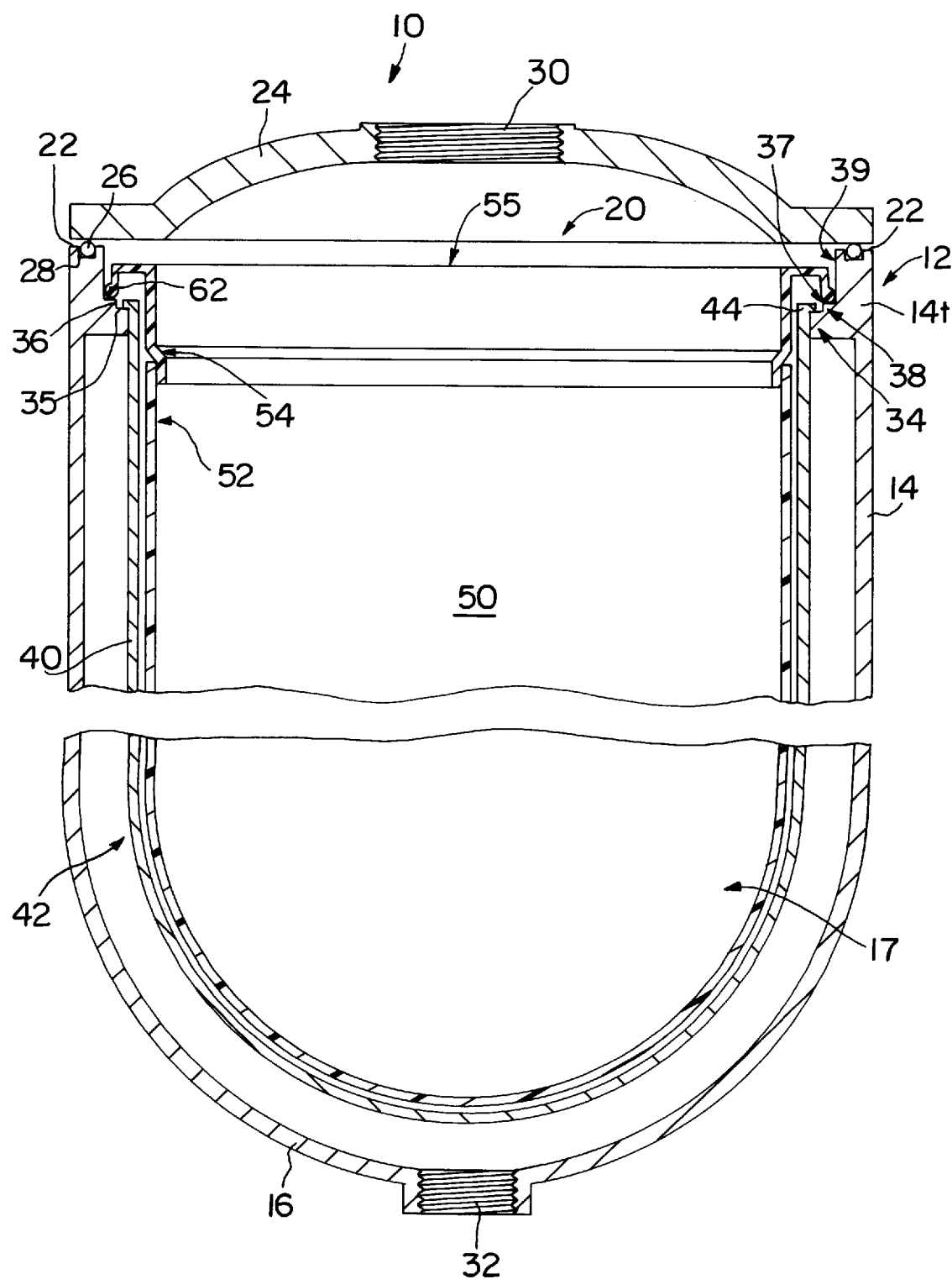
FIG. 1 shows a filter housing which is provided with a filter supporting basket and filter bag therein.

Filter 10 illustrated in sectionalized form in FIG. 1, includes a housing 12 formed by an annular side wall 14 and a concave bottom wall 16, thereby defining an internal chamber 17. An open upper end 20 is formed in housing 12 and is oppositely located from bottom wall 16 of the housing. The opening 20 is limited by the side wall end edge 22 which also acts to receive a top lid 24 which spans opening 20. Top lid 24 can have an accurate configuration or merely consist of a flat plate. It is secured to the housing by removable threaded hold-down members which are well known by those in the art and are not shown here. An O-ring seal 26 is shown compressed between lid 24 and housing end edge 22 to form a liquid type seal. The O-ring is inserted into an annular groove 28 formed in end edge 22. Filter 10 further includes an inlet port 30 formed in the central portion of lid 24, said inlet port being shown here as a threaded connection so as to receive the appropriate inlet piping necessary to supply the fluid to be filtered within the housing. Inlet port 30 does not have to be threaded, rather it can be formed as an opening for receiving the appropriate piping, which then can be directly welded to the lid. Filter 10 also includes an outlet port 32 formed in the bottom wall of housing 12. The outlet port shown in this embodiment has threads for connecting the appropriate pipe work to conduct filtered fluid out of the filter housing. The necessary pipework can also be directly welded to the bottom of the filter housing.

A first annular shoulder 34 is formed in the upper region 14*t* of housing side wall 14 about the opening into the housing. Located adjacently but spacedly above first annular shoulder 34 is annular support 38. The first annular shoulder 34 is comprised of horizontal surface 35 and vertical surface 36 and similarly the annular support is comprised of horizontal face 37 and vertical face 39. As illustrated in FIG. 1, each respective horizontal and vertical surface or face of shoulder 34 and support 38 is disposed at a right angle to the other. It should be understood from viewing FIG. 2, that the annular support could be formed differently from the way just described, although the same faces 37 and 39 would still be provided as desired. This modification serves the purpose of adapting the present invention to those housings where the faces 37 and 39 are already provided at right angles to another. In those situations, an annular insert ring, which would encompass the area shown in dashed-line form (including the previously-shown face 39 and the top face 39C) could be fitted into the housing prior to insertion of the filter bag. Preferably, the annular ring is made of a metallic material and presents the same characteristics of faces 39 and 37 as described herein.

Figure 2:
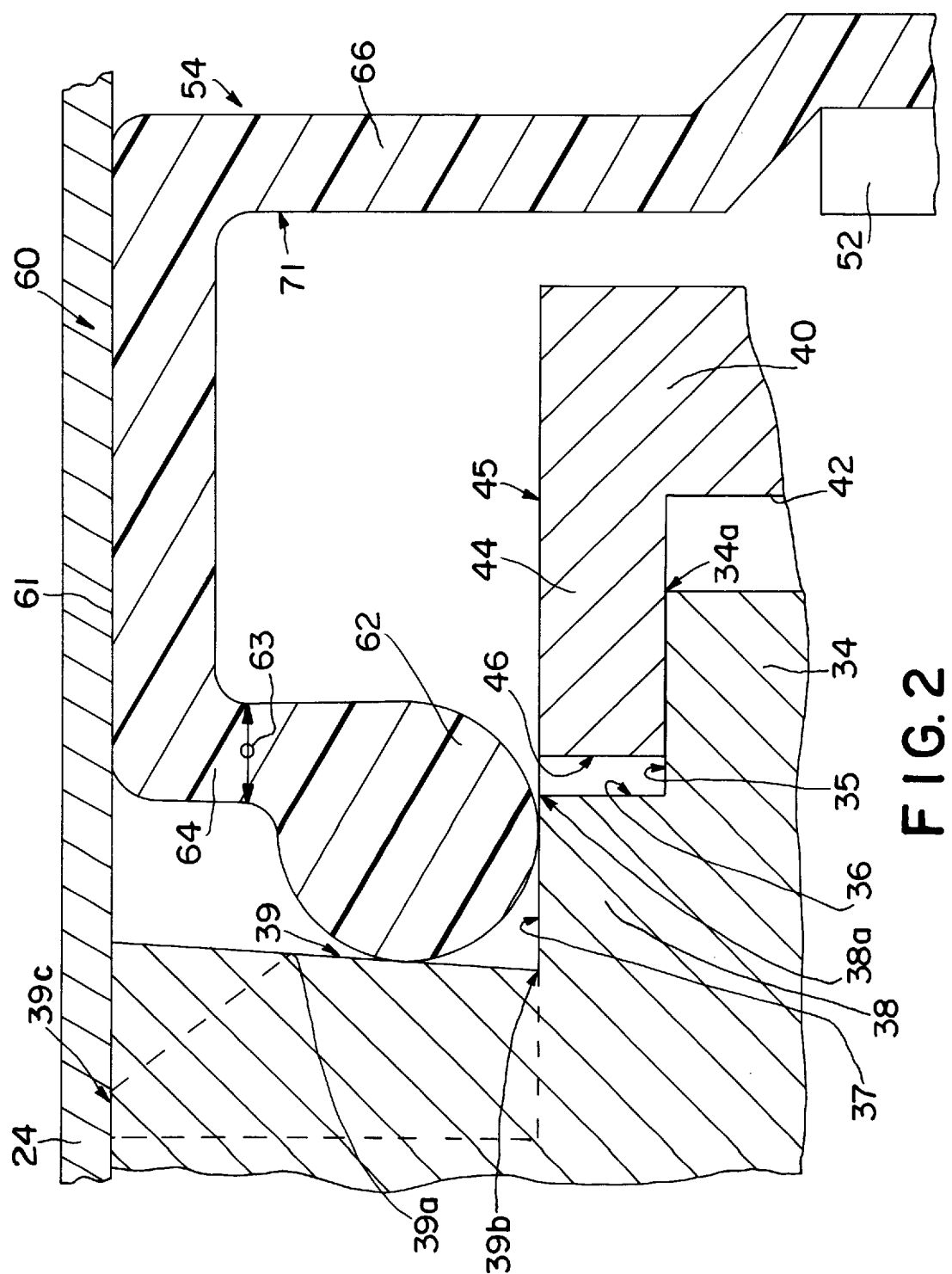
FIG. 2 is a fragmentary sectional view showing the filter bag of the present invention seated in the filter housing.

Seated within housing 12 and internal chamber 17 is basket 40 having a reticulated wall 42 for the purpose of supporting a filter bag 50. The basket is formed of a ridged shape-retaining construction, and is usually constructed from a metal composite and is provided with an out-turned annular flange 44 at the opening into the basket 40. The outer diameter of basket flange 44 exceeds the inner diameter of first annular shoulder 34. In FIG. 2, the inner diameter of first annular shoulder 34 is defined as the diametrical distance across the shoulder when measured at points 34a on each side of the housing. However, the inner diameter of shoulder 34 is less than the inner diameter of annular support 38, permitting the basket to be removably inserted into housing 12 through its opening 20, so that flange 44 overlies and rests upon first annular shoulder 34. The inner diameter of first annular support 38 is defined as the diametrical distance across the support when measured at points 38a on each side of the housing. Filter bag 50 includes a wall part 52 which is formed by a flexible, liquid pervious material such as interwoven nylon, cotton or wool, or polyethylene fiber material which is attached by heat sealing or sewing to a ring part 54 that is mold formed of a flexible, shaped-retaining material such as polypropylene. Ring part 54 defines an opening 55 into bag 50 and includes an out-turned flange 60 which terminates into a bulbous lip 62.

Turning attention to FIGS. 2 and 3, the features of filter bag 50 will now be explained in greater detail. As illustrated, outturned flange 60 of ring part 54 is comprised of a horizontal ledge 61 integrally connected on a proximate end to a vertically upstanding top portion 66 and a distal end integrally connected to a downwardly projecting arm 64 which in turn, terminates with bulbous lip 62, having a substantially round configuration and an outermost surface 62A (see FIG. 4), which defines the widest diameter across ring part 54, and hence bag 50. FIG. 2 illustrates that due to nature of the plastic injection molding process, the arm 64 will include a slightly reduced cross sectional area at the point where the bulbous lip 62 and arm 64 join, illustrated by the heavy arrow. This area is referred to herein as the neck 63, and functionally the neck 63 plays an important role in the sealing of the ring part 54, as will be described later. The vertically upstanding top portion 66 of the outturned flange 60 is integrally connected to the remainder of ring part 54 through a downwardly and inwardly angled interconnecting sidewall 68, which is integrally connected to a vertical segment 70. The bottom vertical segment 70 coextensively receives bag wall part 52 on outside annular surface 71 (FIG. 2), wherein the bag wall is heat sealed by well-known methods along this annular segment so as to attach wall part 52 to ring part 54. The outside diameter of ring part 54 as measured across the outer edge surface 66a of top portion 66, is larger than the outside diameter measured across outside surface 71, so that when bag wall part 52 is heat sealed to vertical bottom segment 70, the outside surface 53 of bag wall part 52 and top portion 66 will be coextensive, as FIG. 4 best shows. With filter top lid 24 removed and basket 40 supported upon first annular shoulder 34 at its flange 44, bag 50 is inserted into basket 40 with bulbous lip 62 of the ring part flexed first upwardly and outwardly toward the vertical wall of the annular support 38 as best illustrated in FIG. 3.

It should be understood that vertical face 39 of annular support 38 is shown in FIG. 1 as a substantially vertical face, although in FIG. 2, it is shown having an undercut in the form of a downwardly sloping face which angles away from the internal chamber of the housing, as defined from the top to the bottom of the vertical face 39. The FIG. 2 illustration is exaggerated for illustration purposes in order to emphasize this feature. In fact, at upper point 39a, the diameter is 7.185 inches, while at 39b, the diameter is 7.210 inches. This twenty five thousandths of an inch taper, allows the undercut to operatively act as a seat for bulbous lip 62. In this way, when the filter bag 50 is inserted into housing 12, the nature of the reduced neck of outturned flange 60 of the plastic ring part 54 will allow it to flex or cam itself very tightly within the undercut face so as to create a frictional snap-fit of the filter bag ring to both faces 37, 39 of shoulder 38, since the outside diameter of the ring part 50, as measured across the outermost edge of bulbous lip 62, is slightly larger than the diameter across the annular support 38, when measured at point 39b. Unexpectantly, the yield of the material of ring part 54 against surfaces 37, 39 caused by forcing the larger diameter ring part 54 into place, creates a liquid impervious seal. This seal is the result of the bulbous lip 62 becoming squeezed and becoming ever-so-slightly deformed between faces 37, 39, under the action of neck 63 flexing or camming towards the direction of the heavy arrow (FIG. 2). The neck 63 and lip 62 will remain flexed due to the same deformative action of horizontal ledge 61. It is seen that ring part 54 will be closely toleranced next to basket 40, with bulbous lip 62 making peripheral liquid sealing contact with vertical wall 39 and horizontal wall 37.

As FIG. 2 best illustrates, the bulbous lip 62 also makes liquid sealing contact at the region where flange 44 seats within annular shoulder 34. Even though it appears in the illustration that there is a gap between the end surface of flange 44 and vertical surface 36, it should be understood that the extent of this gap is exaggerated only for illustration purposes and in reality does not amount to more than 0.005 inches. Thus, it should be appreciated that lip 62 does create a sealing contact between flange 44 and vertical surface 36.

Turning attention to FIG. 3, it is seen that ring part 54 includes a lone handle 80 that is integrally formed to the bottom segment 70, at its lowermost point. This handle will be present on the embodiments presented herein, even though not mentioned later. When handle 80 is pulled upwardly away from housing bottom wall 16, outturned flange 60 is flexed and cammed inwardly so as to release the engagement between bulbous lip 62 and wall 39, thereby releasing the filter bag 50 for the purpose of replacement or cleaning.

Figures 5, 6:
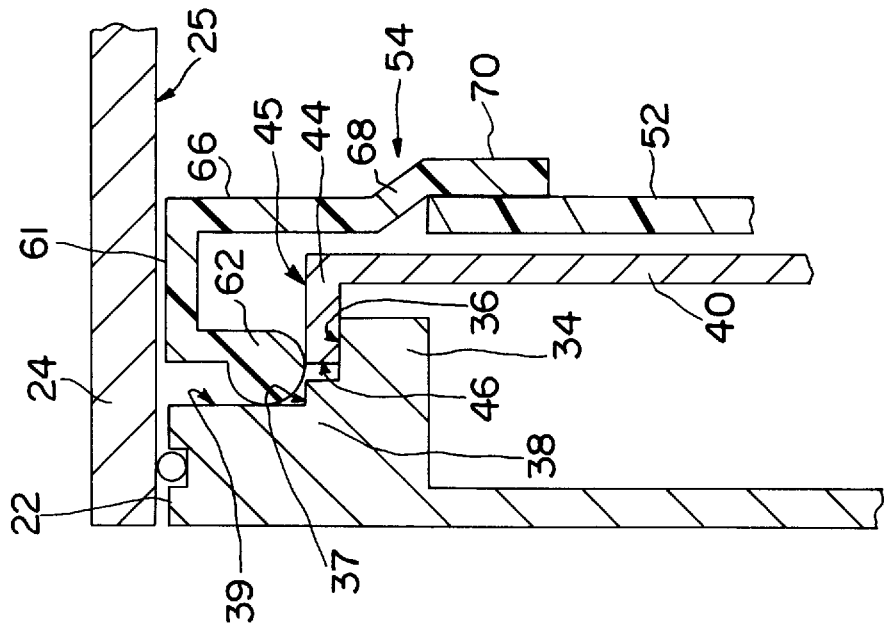
FIG. 5 is a partial cross sectional view of a second embodiment of the invention.
FIG. 6 is a partial cross sectional view of a third embodiment of the invention.

Now turning attention to FIGS. 5 and 6, a second and third embodiment of the invention will be described. In FIG. 5, it is seen that housing 12 only includes the annular support 38 for receiving thereon the flange 44 of basket 40, resting on horizontal face 37. Here, the ring part 54 of the filter bag 50 is superposed on flange 44. When lid 24 (herein a flat configuration) is secured to housing 12, the inside lid surface 25 contacts horizontal ledge 61, pushing outturned flange 60 downwardly, such that bulbous lip 62 is simultaneously forced tightly against vertical face 39 of support 38, and top surface 45 of flange 44, so as to unexpectantly create a liquid impervious seal that can tolerate relatively high operating pressures.

FIG. 6 shows a third embodiment of the invention wherein an annular shoulder 34 is provided for receiving flange 44, but where the annular support 38 is now provided with a relatively short horizontal face 37 so as to cause bulbous lip 62 to be positioned with generally half of its surface area overlying the terminal edge 46 of the flange. When lid 24 is secured to housing 12, inside surface 25 contacts horizontal ledge 61, pushing outturned flange 60 downwardly, such that bulbous lip 62 is simultaneously forced tightly against vertical face 39 and coincidentally against horizontal surface 37 and flange surface 45, to unexpectantly create a liquid impervious seal at vertical face 39 and at the juncture between flange terminal edge 46, horizontal face 37, and the vertical surface 36 of annular shoulder. It should also be emphasized that with the FIGS. 5 and 6 embodiments, the horizontal ledge 61 functionally becomes a quasi-seal between the lid and the housing when the lid secured to the housing. By that it is meant that although O-ring 26 is the primary means for creating the liquid impervious seal between the lid 24 and the housing 12, this ledge-lid interface also will function to create a seal between the lid and housing.

While the invention has been described in connection with a filter bag ring having a camming flange portion which terminates with a bulbous lip, one skilled in the art will appreciate that the invention is not necessarily as limited and that minor modifications may be made within the scope of the appended claims.

I claim:

1. A liquid filter comprising: a housing having an annular sidewall and an interconnecting bottom wall which define an internal chamber therein, said housing having an upper opening into said internal chamber, said opening delimited by an annular shoulder and an annular support located spacedly above said shoulder, said annular shoulder comprised of a horizontal and vertical surface and said annular support comprised of a horizontal and vertical face, said shoulder and support located at an upper region of said sidewall proximate to said opening;

a top lid spanning said housing opening;

inlet and outlet ports located in liquid flow communication through said internal chamber of said housing, said inlet port located within said top lid and said outlet port located within said bottom wall;

a filter bag for filtering liquid passed through said filter, said filter bag having an opening defined by a flexible shape-retaining ring portion and a liquid impervious wall part attached to said ring portion, said ring portion being liquid impervious and having an annular flange terminating in a downturned bulbous lip;

a reticulated basket having an annular flange delimiting an opening therein, said basket inserted within said internal chamber with said annular flange in resting contact on said annular shoulder;

a removable annular insert ring in abutting contact with said annular support, said annular insert ring having a front wall, a rear wall, and interconnecting top and bottom walls, said rear wall contacting said vertical face of said annular support, said bottom wall in resting contact against on said horizontal face of said annular support, and said front wall in sealing contact with said bulbous lip of said edge portion on said filter bag, said front wall having an undercut, wherein said annular supported includes an undercut face and said annular flange of said ring portion is adapted to flex downardly and inwardly towards said internal chamber so as to wedge said bulbous lip within said undercut face of said annular support, thereby forming a liquid impervious seal between said housing and said filter bag without the need for a dedicated groove within said housing for receiving said bulbous lip.

2. The liquid filter of claim 1, wherein said outturned flange of said ring portion is disposed vertically spaced above said first annular shoulder when said bag is fitted within said internal chamber.

3. The liquid filter of claim 2, wherein said top lid does not contact said outturned flange when said filter bag is inserted within said housing.

4. The liquid filter of claim 2, wherein said top lid contacts said outturned flange when said filter bag is inserted within said housing.

5. A liquid filter comprising: a housing having an annular sidewall and an interconnecting bottom wall which define an internal chamber therein, said housing having an upper opening into said internal chamber, said opening delimited by an annular shoulder and an annular support located spacedly above said shoulder, said annular shoulder comprised of a horizontal and vertical surface and said annular support comprised of a horizontal and vertical face, said shoulder and support located at an upper region of said sidewall proximate to said opening;

a top lid spanning said housing opening;

inlet and outlet ports located in liquid flow communication through said internal chamber of said housing, said inlet port located within said top lid and said outlet port located within said bottom wall;

a filter bag for filtering liquid passed through said filter, said filter bag having an opening defined by a flexible shape-retaining ring portion, said ring portion being liquid impervious and having an annular flange terminating in a downturned bulbous lip;

a reticulated basket having an annular flange delimiting an opening therein, said basket inserted within said internal chamber with said annular flange in resting contact on said annular shoulder;

wherein said annular flange of said ring portion is adapted to flex downwardly and inwardly towards said internal chamber so as to wedge said bulbous lip against said vertical face of said annular support, thereby forming a liquid impervious seal between said housing and said filter bag without the need for a dedicated groove within said housing for receiving said bulbous lip.

6. The liquid filter of claim 5, wherein said flange includes a terminal edge, said bulbous lip superposed over said annular shoulder and said terminal edge on the flange of said basket, thereby creating a liquid impervious seal between said filter bag and said basket.

7. The liquid filter of claim 6, wherein said bulbous lip is simultaneously and partially contacting said annular shoulder and said terminal edge on the flange of said basket.

8. The liquid filter of claim 6 wherein said flange of said basket is disposed between said bulbous lip of said outturned flange and said horizontal face of said annular shoulder so as to simultaneously contact said horizontal face of said annular shoulder and said bulbous lip.

9. The liquid filter of claim 8 wherein said top lid includes an inside surface, said surface in contact with said outturned flange of said ring part of the filter bag.

10. The liquid filter of claim 7, wherein said top lid includes an inside surface, said surface in contact with said outturned flange of said ring portion of the filter bag.

11. The liquid filter of claim 5 further including a removable annular insert ring in abutting contact with said annular support, said annular insert ring having a front wall, a rear wall, and interconnecting top and bottom walls, said rear wall contacting said vertical face of said annular support, said bottom wall in resting contact against on said horizontal face of said annular support, and said front wall having an undercut, wherein said annular flange of said ring portion is adapted to flex downwardly and inwardly towards said internal chamber so as to wedge said bulbous lip within said undercut of said annular insert ring such that said filter bag is frictionally snap-fitted within said housing, thereby forming a liquid impervious seal without the need for a dedicated groove for receiving said bulbous lip.

12. The liquid filter of claim 11, wherein said annular insert has a thickness defined by a distal extent between said front and real walls, said thickness such that said bulbous lip is partially superposed over said first annular shoulder and said terminal edge on the flange of said basket, thereby creating a liquid impervious seal between said filter bag and said basket.

13. A filter bag for filtering liquid passed through a liquid filter housing, said housing defined by an annular sidewall interconnecting with a bottom wall, said housing having an upper opening in communication with an internal chamber, said opening delimited by an annular shoulder and an annular support located spacedly above said shoulder, said shoulder and support located at an upper region of said sidewall proximate to said opening, said annular shoulder comprised of a vertical and horizontal surface and said annular support comprised of a vertical and horizontal face, said housing including a top lid which sealingly closes said opening and a reticulated basket inserted within said internal chamber, said basket including an annular flange delimiting an opening therein, said annular flange in resting contact on said annular shoulder and presenting a top surface towards said housing opening and a terminal edge normal to said top surface, said bag comprising.

a flexible shape-retaining ring portion impervious to liquids and having an annular outturned flange terminating in a downturned bulbous lip;

a liquid pervious wall part attached to said ring portion, wherein said outturned flange is adapted to flex downwardly and inwardly towards said internal chamber so as to form a liquid impervious seal between said housing and filter bag.

14. The filter bag of claim 13, wherein said outturned flange is comprised of a horizontal ledge having a proximate and distal end, said proximate end integrally connected to a vertically upstanding top portion and said distal end integrally connected to a downwardly projecting arm that terminates with said bulbous lip, said vertical upstanding portion integrally connected to a downwardly angled sidewall that terminates with a bottom vertical segment.

15. The filter bag claim 14, wherein said arm includes a reduced cross sectional area at a point where said bulbous lip joins said arm.

16. The filter bag of claim 14, wherein said wall part is coextensive with said vertically upstanding top portion when attached to said vertical bottom segment.

17. The filter bag of claim 16, wherein said vertical upstanding top portion has an outer edge surface defining an outerside diameter across said upstanding top portion and said vertical bottom segment has an outside surface defining an outside diameter across said bottom vertical segment, said outside diameter across said bottom segment being relatively larger than said outside diameter across said upstanding top portion.

18. The filter bag claim 17, wherein said outermost surface of said bulbous lip defines a widest diameter across said ring part of said filter bag.

* * * * *